United States Patent
Piper et al.

(10) Patent No.: US 9,519,931 B2
(45) Date of Patent: Dec. 13, 2016

(54) SYSTEM AND METHOD FOR PERSONALIZED ACTIONABLE NOTIFICATIONS

(71) Applicant: eBay Inc., San Jose, CA (US)

(72) Inventors: Shawn Piper, Beaverton, OR (US); Mark Joseph Eppolito, Portland, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/714,144

(22) Filed: May 15, 2015

(65) Prior Publication Data

US 2016/0335710 A1 Nov. 17, 2016

(51) Int. Cl.
*G06Q 30/00* (2012.01)
*G06Q 30/06* (2012.01)
*G06Q 30/08* (2012.01)
*G06F 3/048* (2013.01)
*G08B 27/00* (2006.01)
*H04W 4/12* (2009.01)
(Continued)

(52) U.S. Cl.
CPC ........... *G06Q 30/0641* (2013.01); *G06F 3/048* (2013.01); *G06Q 30/08* (2013.01); *G08B 27/006* (2013.01); *H04W 4/12* (2013.01); *H04W 8/18* (2013.01); *H04W 68/04* (2013.01)

(58) Field of Classification Search
None
See application file for complete search history.

(56) References Cited

U.S. PATENT DOCUMENTS

2001/0055963 A1* 12/2001 Cloutier .................. H04W 4/12
455/417
2003/0220867 A1* 11/2003 Goodwin ............... G06Q 30/08
705/37

(Continued)

OTHER PUBLICATIONS

Edwin Li, User Experience Designer: Prototype, Action drawer overlaid, webOS v3+ Actionable Notifications, May 31, 2013 (May 31, 2013). [Accessed via http://edwinli.com/ux/03a-command-drawer-open/].*

(Continued)

*Primary Examiner* — William Allen
*Assistant Examiner* — Allison Wood
(74) *Attorney, Agent, or Firm* — Schwegman, Lundberg & Woessner, P.A.

(57) ABSTRACT

Systems and methods of personalized actionable notifications are disclosed. In some example embodiments, event information indicating an event for an item is received, a determination is made to provide a notification of the event to the user based on the event information and user activity information for the user, the notification is generated based on the determination, and the generated notification is caused to be displayed on a screen of the computing device via an application on a computing device of the user without causing the computing device to leave a context of content being displayed on the computing device prior to the notification being displayed on the computing device, the application being independent of the context, the notification overlaying the content, and the notification further comprising at least one user interface element configured to enable the user to request an action to be performed for the item.

13 Claims, 13 Drawing Sheets

(51) Int. Cl.
 *H04W 68/04* (2009.01)
 *H04W 8/18* (2009.01)

(56) References Cited

U.S. PATENT DOCUMENTS

| | | | |
|---|---|---|---|
| 2007/0210908 A1* | 9/2007 | Putterman | G08B 1/08 |
| | | | 340/506 |
| 2012/0078700 A1 | 3/2012 | Pugliese, III V, et al. | |
| 2012/0284143 A1 | 11/2012 | Hunter et al. | |
| 2013/0336310 A1 | 12/2013 | Laasik et al. | |

OTHER PUBLICATIONS

International Application Serial No. PCT/US2016/032407, International Search Report mailed Aug. 12, 2016, 2 pgs.
International Application Serial No. PCT/US2016/032407, Written Opinion mailed Aug. 12, 2016, 5 pgs.

* cited by examiner

SYSTEM AND METHOD FOR PERSONALIZED ACTIONABLE NOTIFICATIONS

TECHNICAL FIELD

Embodiments of the present disclosure relate generally to data processing and, more particularly, but not by way of limitation, to systems and methods of personalized actionable notification user interface elements.

BACKGROUND

Certain computing devices, particularly mobile devices, suffer from limited screen space. This limited display area is particularly prevalent with wearable devices. As a result, launching an application on such a device while the device is presenting a particular context (e.g., an operating system home screen or another application) can cause the device to leave that context. As a result, the user is required to go back and forth between one context and another, causing an inefficient use of time and resources, as well as being confusing and disruptive to the user.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
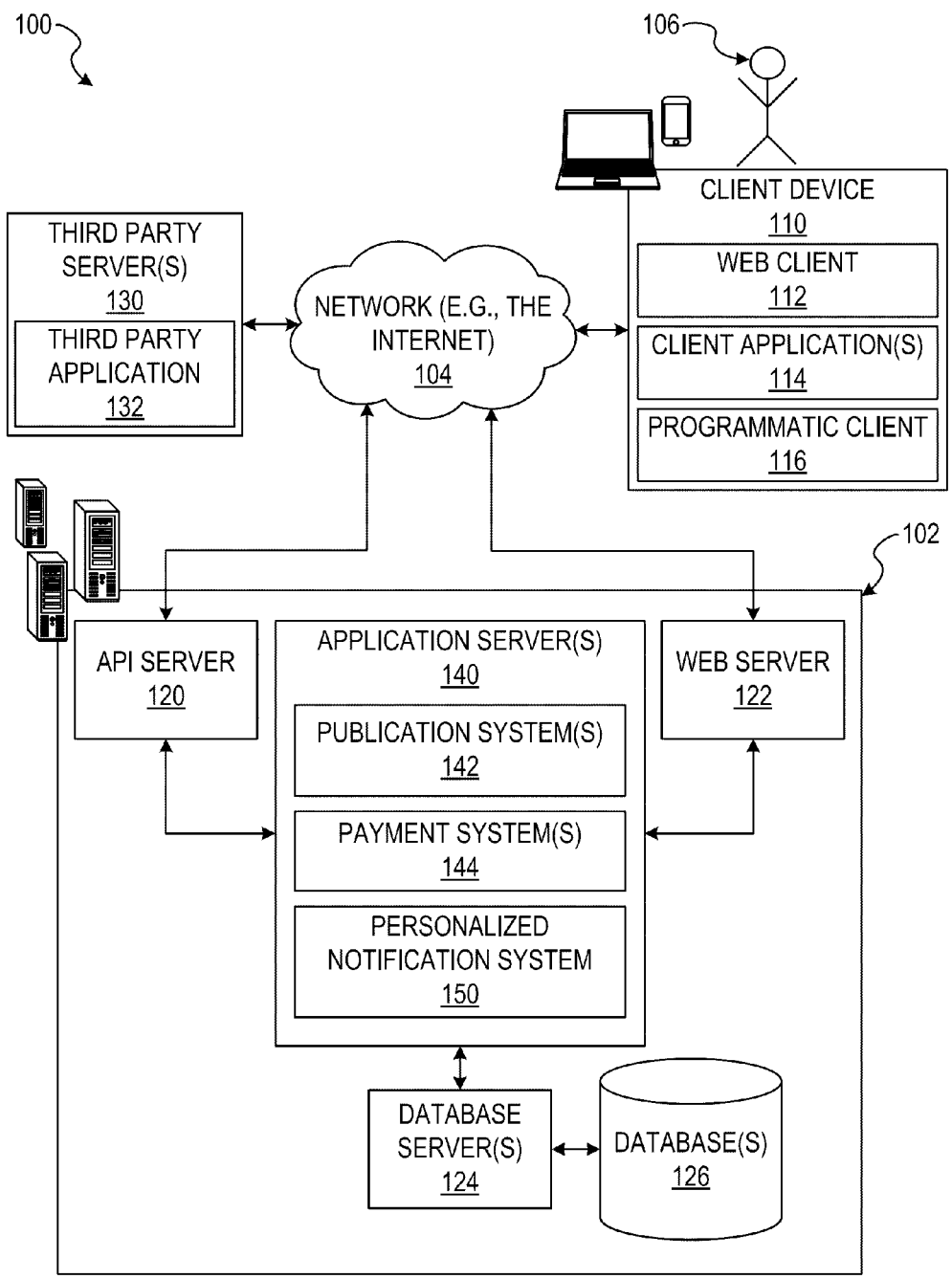
FIG. 1 is a block diagram illustrating a networked system, in accordance with some example embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The present disclosure provides technical solutions for providing personalized actionable notification user interface elements. These technical solutions provide an efficient use of resources of a computing device, including screen space and load processing.

Systems and methods of personalized actionable notification user interface elements are disclosed herein. In some example embodiments, first event information indicating a first event for a first item is received, a determination is made to provide a first notification to a user based on the first event information and user activity information for the user; the first notification is generated based on the determination to provide the first notification, with the generated first notification comprising the first event information, and the generated first notification is caused to be displayed on a screen of a computing device via a first application on the computing device of the user without causing the computing device to leave a first context of first content being displayed on the computing device prior to the generated first notification being displayed on the computing device. In some example embodiments, the first application is independent of the first context of the first content, the generated first notification overlays the first content, and the generated first notification further comprises at least one first user interface element configured to enable the user to request a first action to be performed for the first item. In some example embodiments, the first user interface element(s) is generated so that it provides an easy mechanism for the user to indicate the first decision indication (e.g., selectable menu bar or wheel, "Yes" or "No" buttons, thumbs-up or thumbs-down buttons, and the like).

In some example embodiments, a first decision indication is received from the user via a communication from the generated first notification, with the first decision indication indicating either to perform the first action for the first item or not to perform the first action. In some example embodiments, the first decision indication indicates to perform the first action, and the first action for the first item is caused to be performed based on the first decision indication. In some example embodiments, the user activity information is updated to include the first decision indication.

In some example embodiments, second event information indicating a second event for either the first item or a second item is received, a determination is made to provide a second notification to the user based on the second event information and the updated user activity information for the user, the second notification is generated based on the determining to provide the second notification, with the generated second notification comprising the second event information, and the generated second notification is caused to be displayed on the screen of the computing device via the first application on the computing device without causing the computing device to leave a second context of second content being displayed on the computing device prior to the generated second notification being displayed on the computing device, with the first application being independent of the second context of the second content, the generated second notification overlaying the second content, and the generated second notification further comprising at least one second user interface element configured to enable the user to request a second action to be performed for the first item or the second item.

In some example embodiments, the user activity information comprises at least one of a browsing history of the user, a bidding history of the user, a purchase history of the user, and a location of the user. In some example embodiments, the determination to provide the first notification is further based on at least one of a determined time-sensitivity level of the event and a purchase path position of the item. In some example embodiments, the first action comprises placing a bid on the first item, raising a bid on the first item, adding the first item to a shopping cart, purchasing the first item, and responding to a question corresponding to the first item.

In some example embodiments, the computing device comprises a mobile device. In some example embodiments, the display of the generated first notification on the screen is restricted to less than half of the screen.

In some example embodiments, the first context of the first content comprises a home screen of an operating system of the computing device or a second application separate and independent of the first application.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142, payment systems 144, and personalized notification system 150, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The personalized notification system 150 provides functionality operable to perform various personalized notification operations, as will be discussed in further detail below. The personalized notification system 150 may access the data from the databases 126, the third party servers 130, the publication system 142, and other sources. In some example embodiments, the personalized notification system 150 may analyze the data to perform personalized notification operations. In some example embodiments, the personalized notification system 150 communicates with the publication systems 142 (e.g., accessing item listings) and payment system 144. In an alternative embodiment, the personalized notification system 150 is be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and personalized notification system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
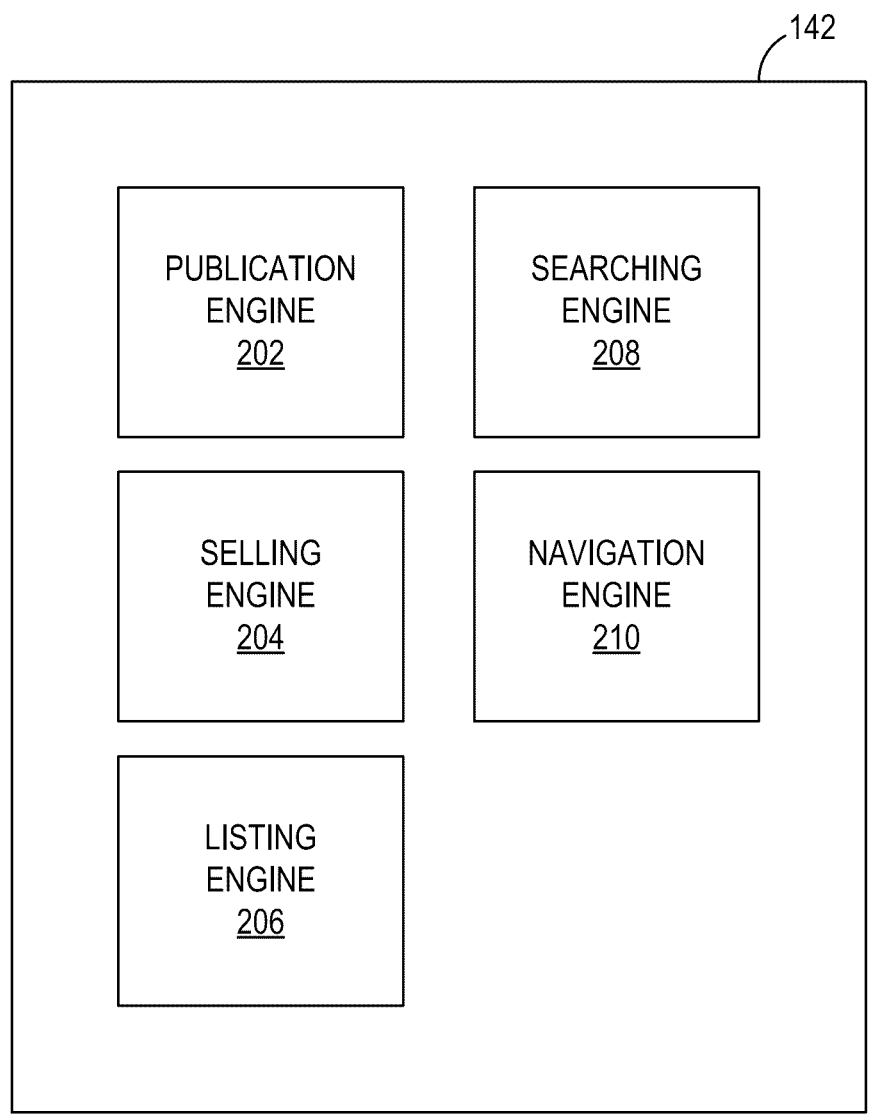
FIG. 2 is a block diagram illustrating various components of a network-based publication system, in accordance with some example embodiments.

FIG. 2 is a block diagram illustrating various components of the network-based publication system 142, in accordance with some example embodiments. The publication system 142 can be hosted on dedicated or shared server machines that are communicatively coupled to enable communications between server machines. The components themselves are communicatively coupled (e.g., via appropriate interfaces) to each other and to various data sources, so as to allow information to be passed between the components or so as to allow the components to share and access common data. Furthermore, the components can access one or more databases 126 via the database servers 124.

The publication system 142 can provide a number of publishing, listing, and/or price-setting mechanisms whereby a seller (also referred to as a first user) can list (or publish information concerning) goods or services for sale or barter, a buyer (also referred to as a second user) can express interest in or indicate a desire to purchase or barter such goods or services, and a transaction (such as a trade) can be completed pertaining to the goods or services. To this end, the publication system 142 can comprise at least one publication engine 202 and one or more selling engines 204. The publication engine 202 can publish information, such as item listings or product description pages, on the publication system 142. In some embodiments, the selling engines 204 can comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines can also provide a number of features in support of these auction-format listings, such as a reserve price feature whereby a seller can specify a reserve price in connection with a listing and a proxy-bidding feature whereby a bidder can invoke automated proxy bidding. The setting engines 204 can further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the publication system 142. In some embodiments, the listings can be an offer, deal, coupon, or discount for the good or service. Each good or service is associated with a particular category. The listing engine 206 can receive listing data such as title, description, and aspect name/value pairs. Furthermore, each listing for a good or service can be assigned an item identifier. In other embodiments, a user can create a listing that is an advertisement or other form of information publication. The listing information can then be stored to one or more storage devices coupled to the publication system 142 (e.g., databases 126). Listings also can comprise product description pages that display a product and information (e.g., product title, specifications, and reviews) associated with the product. In some embodiments, the product description page can include an aggregation of item listings that correspond to the product described on the product description page.

The listing engine 206 can also allow buyers to conveniently author listings or requests for items desired to be purchased. In some embodiments, the listings can pertain to goods or services that a user (e.g., a buyer) wishes to transact via the publication system 142. Each good or service is associated with a particular category. The listing engine 206 can receive as much or as little listing data, such as title, description, and aspect name/value pairs, that the buyer is aware of about the requested item. In some embodiments, the listing engine 206 can parse the buyer's submitted item information and can complete incomplete portions of the listing. For example, if the buyer provides a brief description of a requested item, the listing engine 206 can parse the description, extract key terms, and use those terms to make a determination of the identity of the item. Using the determined item identity, the listing engine 206 can retrieve additional item details for inclusion in the buyer item request. In some embodiments, the listing engine 206 can assign an item identifier to each listing for a good or service.

In some embodiments, the listing engine 206 allows sellers to generate offers for discounts on products or services. The listing engine 206 can receive listing data, such as the product or service being offered, a price and/or discount for the product or service, a time period for which the offer is valid, and so forth. In some embodiments, the listing engine 206 permits sellers to generate offers from the sellers' mobile devices. The generated offers can be uploaded to the publication system 142 for storage and tracking.

Searching the publication system 142 is facilitated by a searching engine 208. For example, the searching engine 208 enables keyword queries of listings published via the publication system 142. In example embodiments, the searching engine 208 receives the keyword queries from a device of a user and conducts a review of the storage device storing the listing information. The review will enable compilation of a result set of listings that can be sorted and returned to the client device 110 of the user. The searching engine 208 can record the query (e.g., keywords) and any subsequent user actions and behaviors (e.g., navigations).

The searching engine 208 also can perform a search based on the location of the user. A user can access the searching engine 208 via a mobile device and generate a search query. Using the search query and the user's location, the searching engine 208 can return relevant search results for products, services, offers, auctions, and on forth to the user. The searching engine 208 can identify relevant search results both in a list form and graphically on a map. Selection of a graphical indicator on the map can provide additional details regarding the selected search result. In some embodiments, the user can specify as part of the search query a radius or distance from the user's current location to limit search results.

The searching engine 208 also can perform a search based on an image. The image can be taken from a camera or imaging component of a client device or can be accessed from storage.

In a further example, a navigation engine 210 allows users to navigate through various categories, catalogs, or inventory data structures according to which listings can be classified within the publication system 142. For example, the navigation engine 210 allows a user to successively navigate down a category tree comprising a hierarchy of categories (e.g., the category tree structure) until a particular set of listings is reached. Various other navigation applications within the navigation engine 210 can be provided to supplement the searching and browsing applications. The navigation engine 210 can record the various user actions (e.g., clicks) performed by the user in order to navigate down the category tree.

Figure 3:
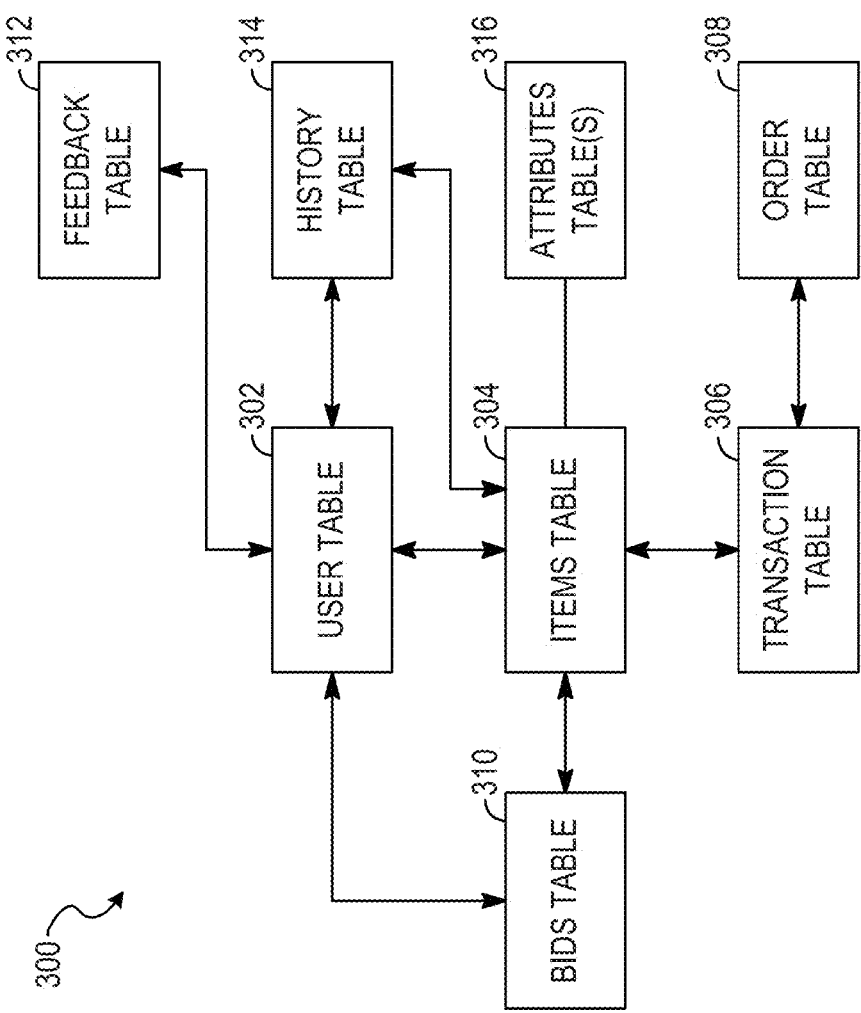
FIG. 3 is a block diagram illustrating various tables that can be maintained within a database, in accordance with some example embodiments.

FIG. 3 is a high-level entity-relationship diagram, illustrating various tables 300 that can be maintained within the database(s) 126, and that are utilized by and support the systems 142, 144, and 150. A user table 302 contains a record for each registered user of the networked system 102, and can include identifier, address and financial instrument information pertaining to each such registered user. A user can operate as a seller, a buyer, or both, within the networked system 102. In one example embodiment, a buyer can be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 can furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, with each order record being associated with an order. Each order, in turn, can be associated with one or more transactions for which records exist within the transaction table 306.

Bid records within a bids table 310 each relate to a bid received at the networked system 102 in connection with an auction-format listing supported by an auction application. A feedback table 312 is utilized by one or more reputation applications, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 can indicate a currency attribute associated with a particular item, with the currency attribute identifying the currency of a price for the relevant item as specified by a seller.

Although FIG. 1 shows personalized notification system 150 residing on application server(s) 140, in some example embodiments, personalized notification system 150 resides on a client device 110. In some example embodiments, when the personalized notification system 150 resides on the client device 140, the personalized notification system 150 communicates with one or more systems of the application server(s) 140, such as with the publication system(s) 142 or the payment system(s) 144, as well as with other components of the networked system 102, such as the database(s) 126.

Figure 4:
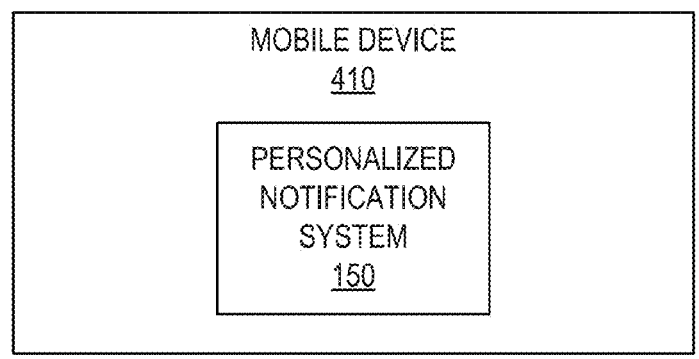
FIG. 4 is a block diagram illustrating a personalized notification system residing on a mobile device

FIG. 4 is a block diagram illustrating personalized notification system 150 residing on a mobile device 410. Examples of the mobile device 410 include, but are not limited to, a smart phone, a tablet computer, and a wearable computing device. Other types of mobile devices 410 are also within the scope of the present disclosure.

Figure 5:
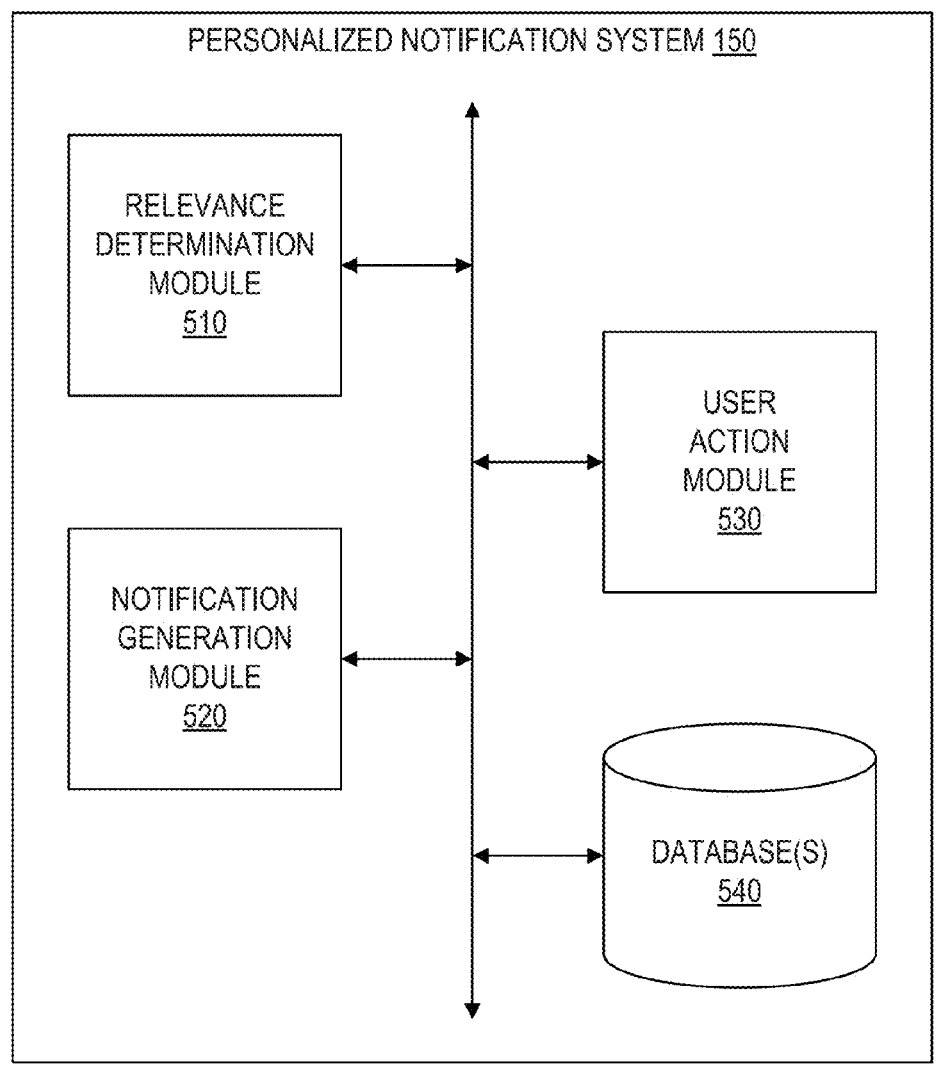
FIG. 5 is a block diagram illustrating components of a personalized notification system, in accordance with some example embodiments.

FIG. 5 is a block diagram illustrating components of the personalized notification system 150, in accordance with some example embodiments. In some example embodiments, the personalized notification system 150 comprises any combination of one or more of a relevance determination module 510, a notification generation module 520, and a user action module 530. In some example embodiments, the personalized notification system 150 also comprises one or more databases 540. The relevance determination module 510, the notification generation module 520, the user action module 530, and the database(s) 540 are communicatively coupled to each other. In some example embodiments, the relevance determination module 510, the notification generation module 520, the user action module 530, and the database(s) 540 reside on a single machines having a memory and at least one processor. In some example embodiments, one or more of the relevance determination module 510, the notification generation module 520, the user action module 530, and the database(s) 540 on different machines, such as some of these components residing on the application server 140 of FIG. 1, while other of these components reside on the mobile device 410 of FIG. 4.

Database(s) 540, or a portion thereof, can be incorporated into database(s) 126 of FIG. 1.

In some example embodiments, the relevance determination module 510 is configured to receive event information indicating an event for an item for sale on an online service (e.g., an e-commerce website). The item can be offered for sale via the publication system(s) 142 in FIG. 1, although, other configurations are also within the scope of the present disclosure. In some example embodiments, the event comprises any activity that is associated with the item on the online service. Such association can be stored in a database (e.g., database(s) 126 of FIG. 1) of the online service. Examples of events include, but are not limited to, an item being offered for an auction sale, an item being offered for a non-auction sale, a user being outbid on an item offered via auction, an auction for an item ending soon (e.g., within a particular amount of time), a non-auction offering of an item for sale ending soon (e.g., within a particular amount of time), and a question related to an item being received. It is contemplated that other types of events are also within the scope of the present disclosure. In some example embodiments, the event information comprises one or more details of the event. For example, if the event comprises a user being outbid on an item offered via auction, then the event information can comprise any combination of one or more of an identification of the item (e.g., item name, product number), a corresponding category of the item (e.g., television, clothing), the current highest bid price of the item, the sale price of the item, the amount of time left on the auction (e.g., the amount of time left for the user to raise his or her bid and win the auction for the item), the amount of time left on the sale of the item (e.g., the amount of time left for the user to view the item, place the item in a shopping cart, or complete the purchase of the item), a location of the item (e.g., a location of the seller of the item), any other attributes of the item of the event, and any other attributes of the corresponding seller or buyer(s) of the item of the event.

In some example embodiments, the event information is received from the online service, such as part of a feed from the publication system(s) 142 in FIG. 1. However, the event information can be transmitted to the relevance determination module 510 from other sources as well. The event information can be pushed or pulled to the relevance determination module 510.

In some example embodiments, the relevance determination module 510 is further configured to determine whether or not to provide a notification of an event to a particular user based on one or more of the corresponding event information for the event and user activity information for that particular user. In this respect, the determination of whether to provide a notification of the event to a particular user can be personalized for that particular user. As a result, the relevance determination module 510 helps conserve the user's time, as well as the resources of user's computing device on which the notification would be provided, by only providing the user with notifications that meet a particular threshold criteria of relevance to the user.

In some example embodiments, the user activity information comprises any data indicating, or otherwise related to, activity of the user. One example of user activity information comprises a browsing history of the user. A browsing history of the user can include, but is not limited to, an identification of items the user has viewed via the online service or any other online service, timing information of such views, or any associated attributes of such items, such as item category, item price, and seller attributes of such items (e.g., a seller rating and location of the seller).

Another example of user activity information comprises a bidding history of the user. A bidding history can include, but is not limited to, an identification of items the user has bid on via the online service or any other online service, timing information of such bids, or any associated attributes of such items, such as item category, item price, and seller attributes of such items (e.g., a seller rating and location of the seller).

Yet another example of user activity information comprises a purchase history of the user. A purchase history can include, but is not limited to, an identification of items the user has purchased via the online service or any other online service, timing information of such purchases, or any associated attributes of such items, such as item category, item price, and seller attributes of such items (e.g., a seller rating and location of the seller).

Yet another example of user activity information comprises a location of the user. The location of the user can be a location stored in association with the user's profile on the online service (e.g., an address entered by the user) or a current location of the user that is detected by the online service or some other online service (e.g., via self-reported positioning or GPS technology).

Yet another example of user activity information comprises position information of an item within a purchase path or conversion funnel for the user. This position information indicates the user's position along the path from an initial awareness of an item to the completed purchase of the item. For example the position information can indicate that the item is in the user's shopping cart, but has not yet been purchased by the user. The position information can comprise position information of the item corresponding to the event information, or can comprise position information of other items, such as an item of the same category. For example, if an item has just been placed on sale on the online service, the fact that the user has a similar item in his or her shopping cart, but has not yet completed the purchase, may be relevant in determining whether to notify the user of the similar the item being placed on sale, such as to allow the user the opportunity to consider the item before completing the purchase of the similar item in the shopping cart.

In some example embodiments, the notification generation module 520 is configured to generate a notification based on a determination by the relevance determination module 510 to provide the notification. The generated notification comprises the event information.

In some example embodiments, the notification generation module 520 is further configured to cause the generated notification to be displayed on a screen of a computing device of the user via an application on the computing device without causing the computing device to leave a context of content being displayed on the computing device prior to the generated notification being displayed on the computing device. For example, if the computing device is currently displaying a home screen of an operating system of the computing device, then when the notification is caused to be displayed on the computing device, the computing device does not leave the home screen to display the notification. Rather, the notification is caused to overlay the content of the home screen. Similarly, if the computing device is currently displaying a page of a mobile application on the computing device, then when the notification is caused to be displayed on the computing device, the computing device does not leave the page of the mobile application to display the notification, but rather the notification is caused to overlay the page of the mobile application.

In some example embodiments, the application through which the notification is displayed on the screen of the computing device is independent of the context of the content being displayed on the computing device prior to the notification being displayed on the computing device. For example, if the computing device is currently displaying a page of a mobile application on the computing device, then when the notification is caused to be displayed on the computing device, the notification is caused to be displayed via another application separate and independent from the mobile application.

In some example embodiments, the relevance determination module 510 is configured to receive event information for multiple events, and to make determinations of whether to provide notifications for each one of the multiple events. For example, the relevance determination module 510 can receive event information for five different events, and determine to provide notifications for only three of the five events. The notification generation module 520 can then generate the corresponding notifications for the three events and provide the three notifications to the computing device of the user either together or separately.

Figure 6A:
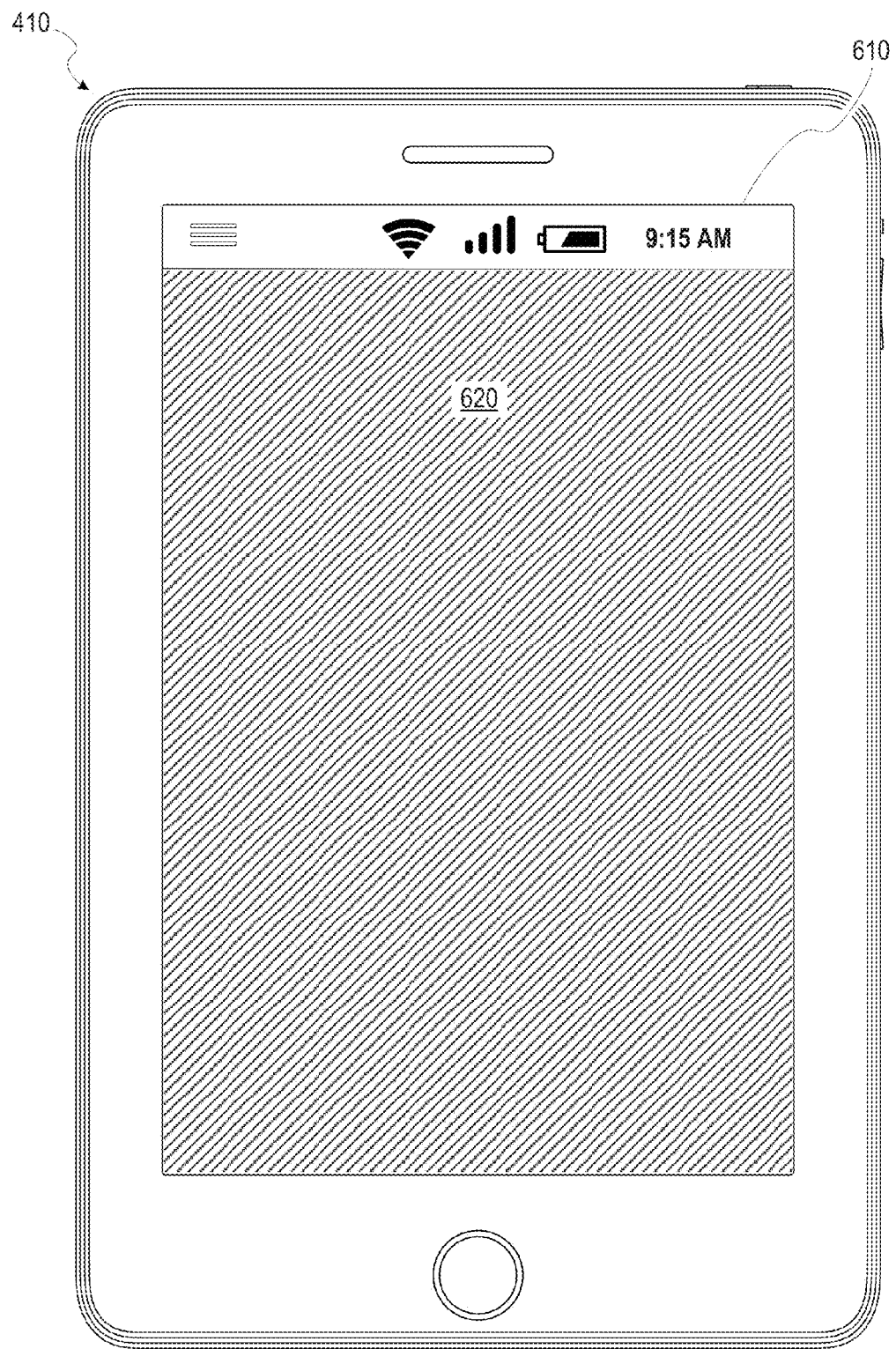
FIG. 6A-6F illustrate different stages of a personalized notification system providing personalized actionable notifications on a mobile device, in accordance with some example embodiments.

FIG. 6A-6F illustrate different stages of the personalized notification system 150 providing personalized actionable notifications on the mobile device 410, in accordance with some example embodiments. In FIG. 6A, the mobile device 410 is displaying content 620 within a particular context (e.g., within a home screen of an operating system or a page of a mobile application) on a screen 610 of the mobile device 410. The content 620 in FIG. 6A is represented as diagonal lines, but it is contemplated that any type of visual content can be displayed as the content 620.

Figure 6B:
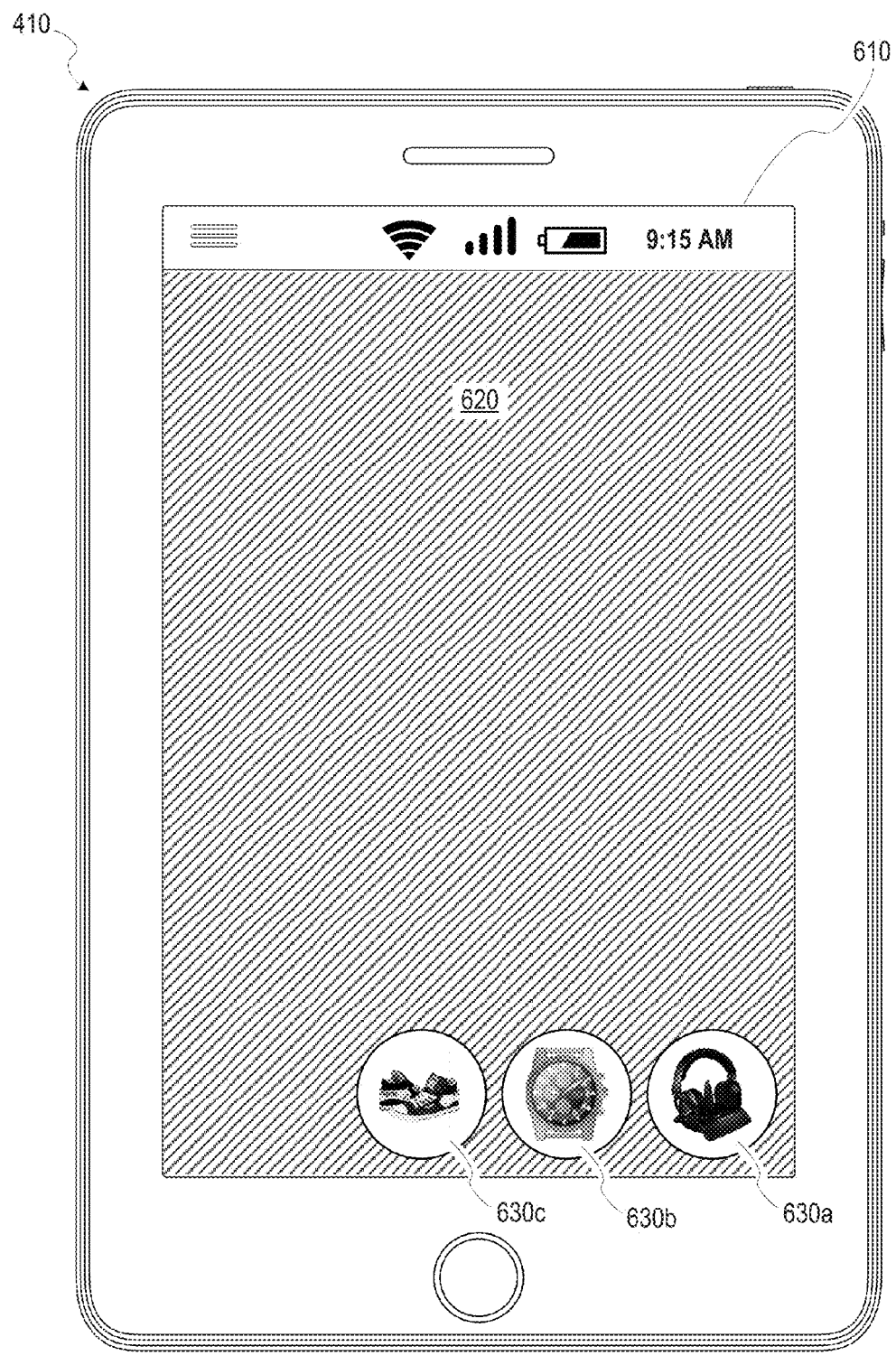

FIG. 6B shows notification indicators 630a, 630b, and 630c being displayed on the screen 610, overlaying the content 620 that was previously being displayed before the display of the notification indicators 630a, 630b, and 630c. The notification indicators 630a, 630b, and 630c can be displayed in response to, or otherwise based on, a determination to provide corresponding notifications for corresponding events. In this fashion, each notification indicator 630 corresponds to a specific notification of a specific event. For example, in the previously-discussed example where the relevance determination module 510 determines to provide notifications for three events, and the notification generation module 520 generates the corresponding notifications for the three events, the notification indicators 630a, 630b, and 630c each correspond to a different one of the three notifications for the three events. Although the example shown in FIG. 6B comprises three notification indicators 630, any number of one or more notification indicators 630 can be employed.

In some example embodiments, each notification indicator 630 comprises a selectable user interface (UI) element configured to indicate the corresponding notification. For example each notification indicator 630 can comprise an icon that represents the corresponding item (e.g., headphones, a watch, shoes) of the corresponding notification.

Figure 6C:
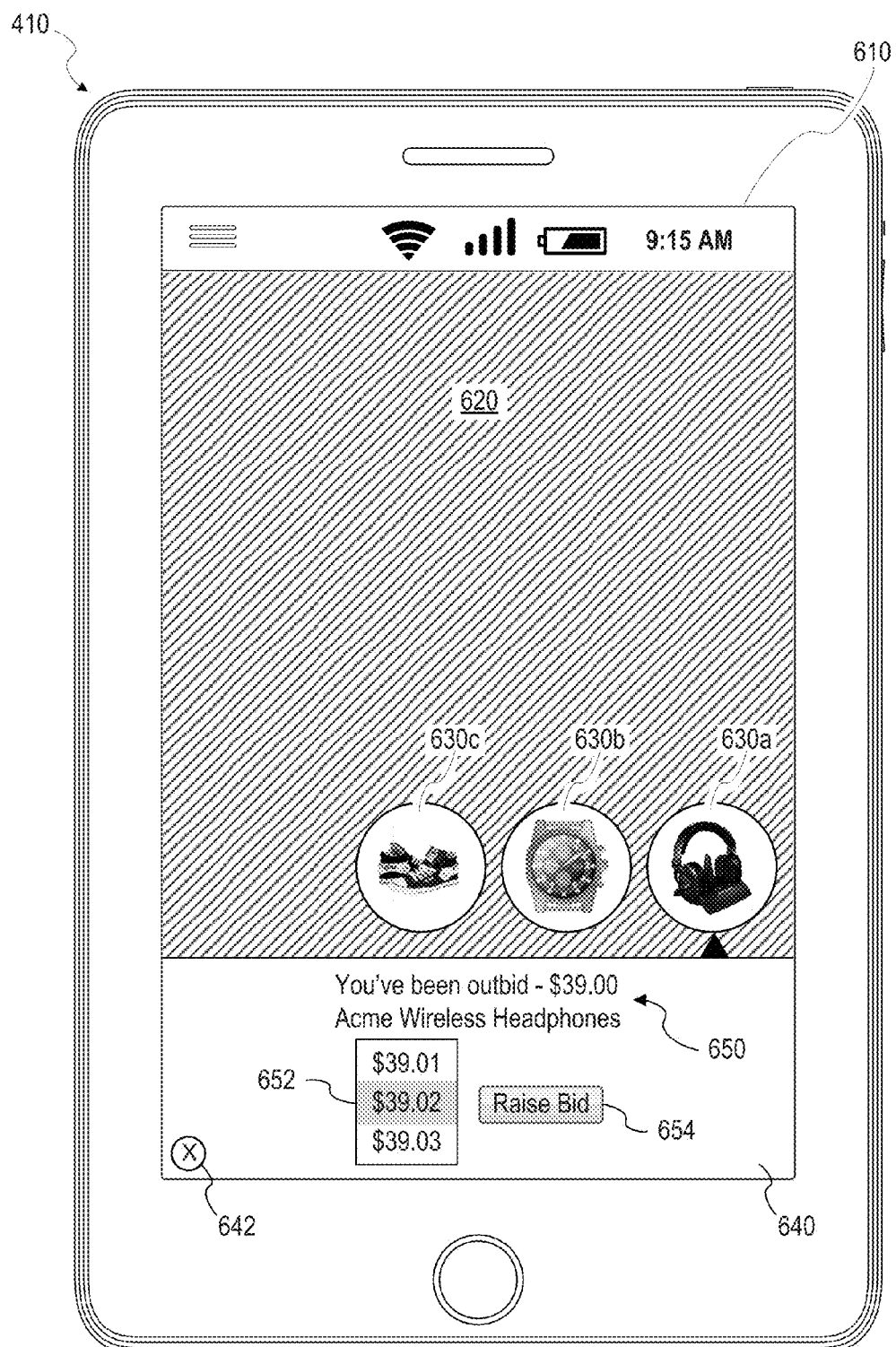
Figure 6D:
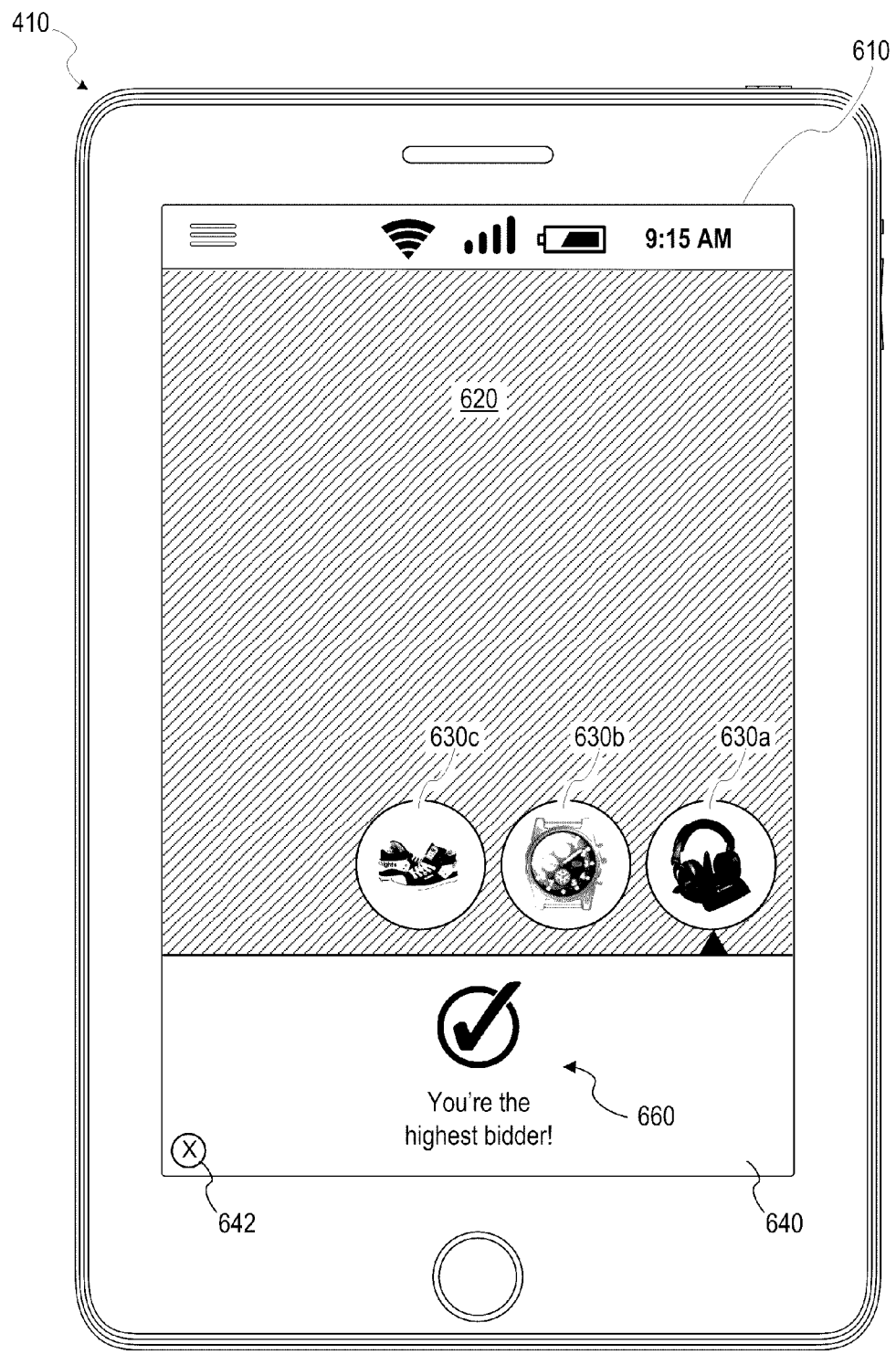

In response to, or otherwise based on, the notification indicator 630 being selected (e.g., clicked, tapped) by the user, a notification area 640 can be displayed on the screen 610, overlaying the content 620, as shown in FIG. 6C. The notification area 640 comprises the generated notification corresponding to the selected notification indicator (e.g., notification indicator 630a in FIG. 6C). The notification comprises the event information 650 corresponding to the event of the notification.

The notification generation module 520 is configured to cause the display of the notification such that the display of the notification does not take up the entire screen 610. In some example embodiments, the display of the generated notification on the screen 610 is restricted to less than half of the screen 610, thereby leaving more than half of the content 620 unobstructed by the display of the notification, and not removing the user visually or functionally from the context that the user was previously engaged in just before the display of the notification.

In FIG. 6C, the event information 650 comprises the user being outbid on an item. In some example embodiments, the notification further comprises at least one UI element configured to enable the user to request an action to be performed for the item of the event. In FIG. 6C, the notification comprises UI element 652 configured to enable the user to select a bid price to which to raise the user's bid, and UI element 654 configured to enable the user to submit a request that the user's bid price be raised to the selected bid price.

In some example embodiments, the notification can also comprise a selectable UI element 642 that is configured to enable the user to dismiss the notification without requesting an action for the item. Alternatively, the user can simply swipe the notification area, or perform some other user interface interaction, to dismiss the notification without requesting an action for the item.

Referring back to FIG. 5, in some example embodiments, the user action module 530 is configured to receive, via the generated notification, a decision indication from the user, with the decision indication indicating either to perform the action for the item (e.g., via the elements 652 and 654 in FIG. 6C) or not to perform the action (e.g., via the UI element 642 in FIG. 6C). In some example embodiments, the user action module 530 is further configured to cause the action for the item to be performed based on a decision indication indicating to perform the action. The user action module 530 can cause the action for the item to be performed by transmitting a corresponding request or instruction to the online service.

In some example embodiments, the user action module 530 is further configured to update the user activity information to include the decision indication. In this respect, the decision indication can subsequently be used by the relevance determination module 510 as part of the user activity information to determine whether or not to provide a notification of another event to the user. For example, the relevance determination module 510 can use the history of the user's decision indications to identify the types of notifications (e.g., a notice that the user have been outbid, a notice that an auction for an item is ending soon notice, a notice of a limited quantity of an item being available) for which the user is most likely to request an action be performed, the types of items (e.g., categories of items, such as electronics, clothing, accessories) for which the user is most likely to request an action be performed, and the timing of notifications (e.g., notifications presented to the user in the morning, notifications presented to the user in the afternoon, notifications presented to the user within a specific time range) for which the user is most likely to request an action be performed. The relevance determination module 510 can then determine which notifications are most likely to be acted upon by the user, and then cause the generation of those notifications by the notification generation module 520. This update and use of the user activity information based on the user's decision indications assists in providing dynamic personalized notifications to the user.

In some example embodiments, the notification generation module 520 is also configured to adjust a configuration of the notification based on user activity information of the user, as well as user activity information of other users, such as other users that are determined to have similar qualities (e.g., interests, purchasing behavior, social connections) as the user for which the notification is being generated. Such configuration details that can be adjusted include the UI elements included in the notification. Other configuration details that can be adjusted include different stages of the notification. For example, a notification may comprise a three stage process for raising a bid. The notification generation module 520 can adjust the notification to a two stage process based on a history of the user requesting actions be performed for notifications having a two stage process as opposed to a three stage process. The notification generation module 520 can employ threshold criteria and statistical comparison techniques to determine the a configuration for a notification, and then make the necessary adjustments (e.g., adjusting the three-stage notification to a two-stage notification). Other types of configuration considerations, determinations, and adjustments are also within the scope of the present disclosure.

In response to a request to perform an action being processed and granted, the user action module 530 can provide a confirmation of the action being performed. For example, in FIG. 6D, a confirmation 660 is displayed, indicating that the user's request to raise the bid (from FIG. 6C) was processed and that the user is now the highest bidder for the corresponding item.

Figure 6E:
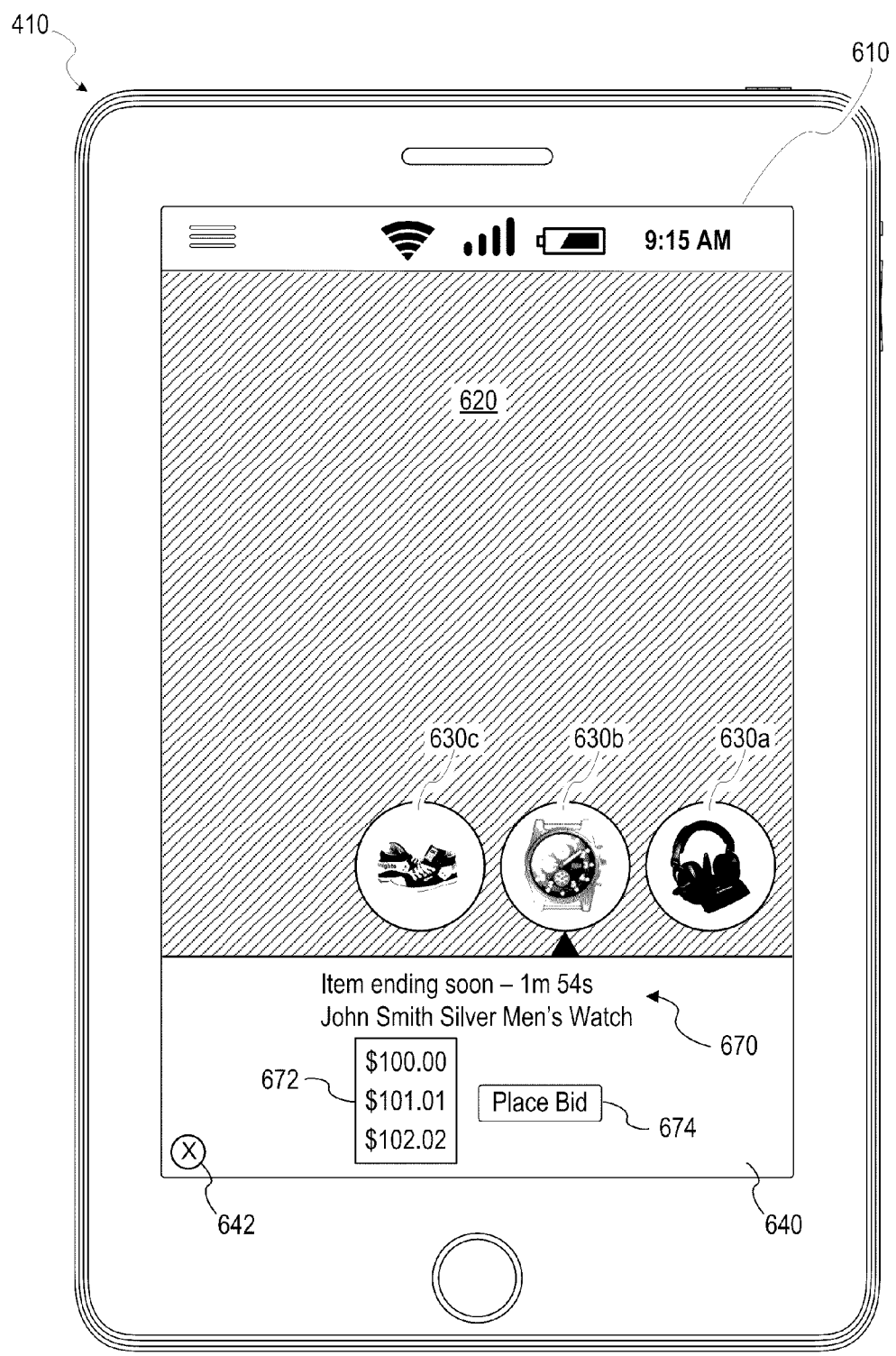

FIG. 6E shows another notification being displayed within the notification area 640 in response to, or otherwise based on, the notification indicator 630b being selected. The notification comprises event information 670. In FIG. 6E, the event information 670 comprises an auction for an item ending soon (e.g., within 1 minute and 54 seconds). The notification in FIG. 6E also comprises UI element 672 configured to enable the user to select a bid price for the item, and UI element 674 configured to enable the user to submit a request that the user's bid price be placed for the item.

Figure 6F:
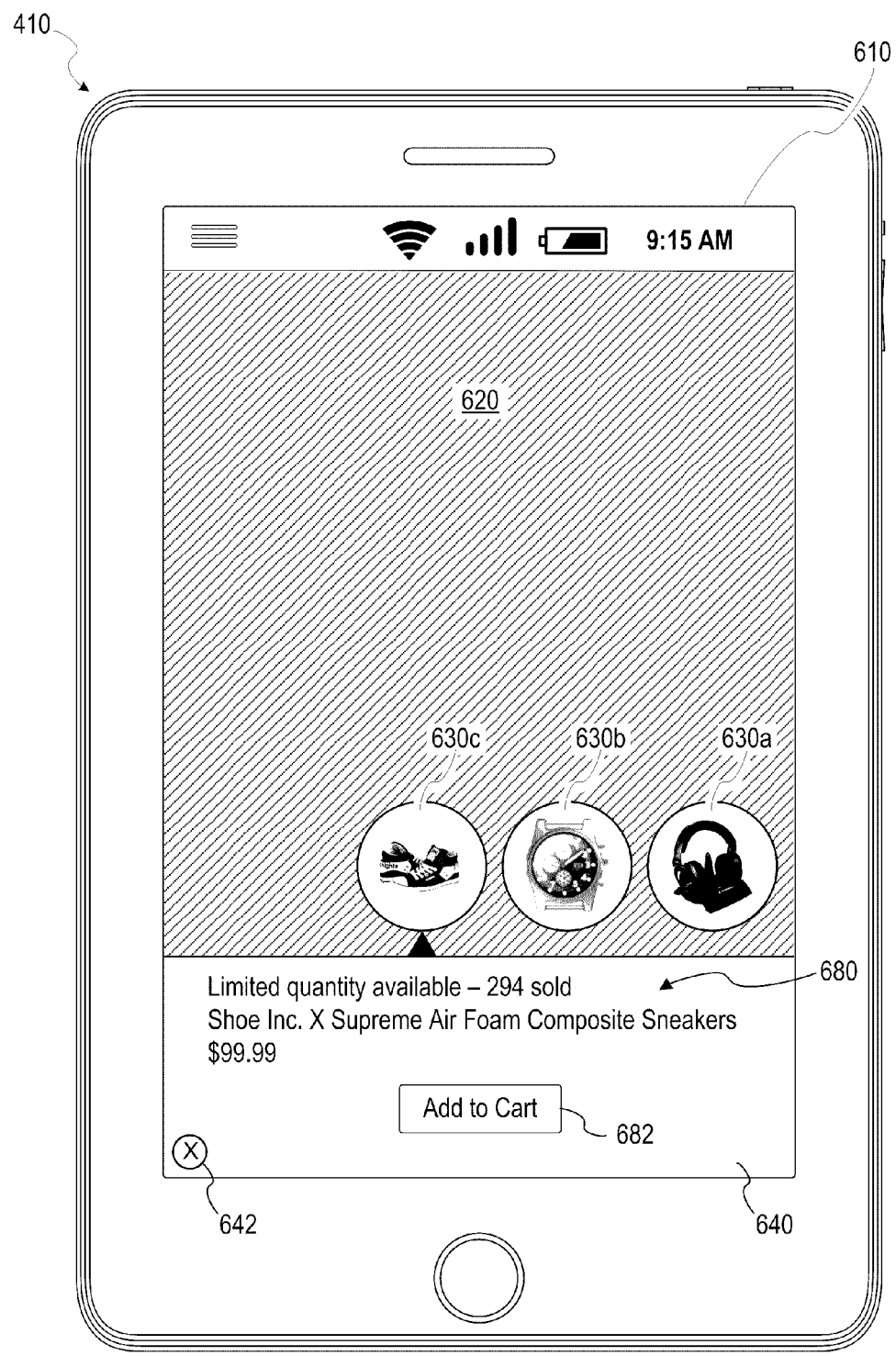

FIG. 6F shows another notification being displayed within the notification area 640 in response to, or otherwise based on, the notification indicator 630c being selected. The notification comprises event information 680. In FIG. 6F, the event information 680 comprises a limited quantity of an item being available, as well as the sale price of the item. The notification in FIG. 6E also comprises UI element 682 configured to enable the user to add the item to a shopping cart of the user.

It is contemplated that other types of notifications other than those shown in FIGS. 6C, 6E, and 6F are also within the scope of the present disclosure.

Figure 7:
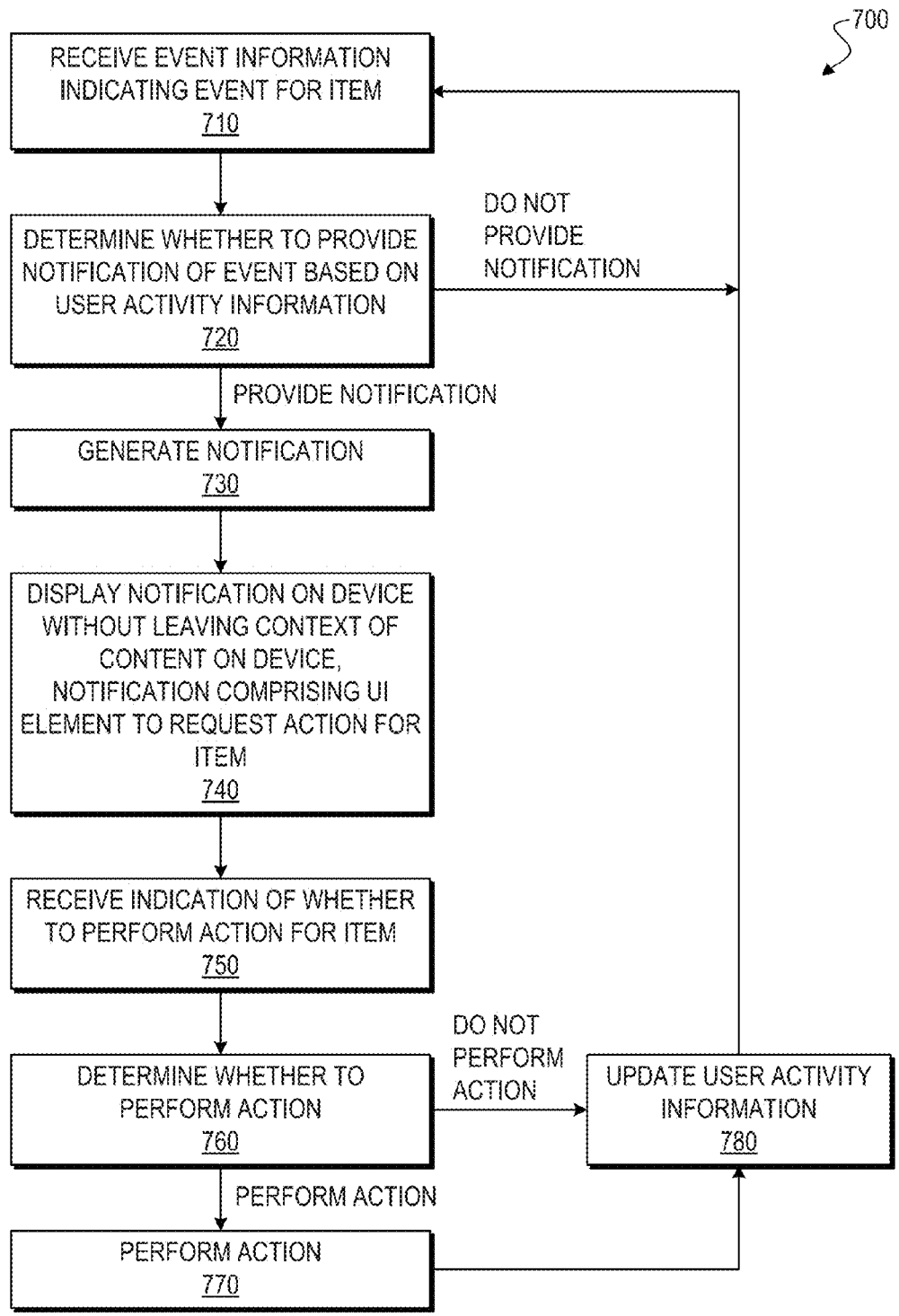
FIG. 7 is a flowchart illustrating a method of providing personalized actionable notifications, in accordance with some example embodiments.

FIG. 7 is a flowchart illustrating a method 700 of providing personalized actionable notifications, in accordance with some example embodiments. The operations of method 700 can be performed by a system or modules of a system. The operations of method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by personalized notification system 150 of FIGS. 1, 4, and 5, or any combination of one or more of its components or modules, as described above.

At operation 710, event information indicating an event for an item is received. At operation 720, a determination is made whether or not to provide a notification of the event to the user based on any combination of one or more of the received event information for the event and user activity information for the user. If it is determined not to provide a notification to the user, then the method 700 returns to the beginning, waiting to receive event information.

If it is determined, at operation 720, to provide a notification to the user, then at operation 730, the notification is generated based on the determination to provide the notification, with the generated notification comprising the event information. At operation 740, the generated notification is caused to be displayed on a screen of a computing device via an application on the computing device of the user without causing the computing device to leave a context of content being displayed on the computing device prior to the generated notification being displayed on the computing device. In some example embodiments, the application is independent of the context of the content, the generated notification overlays the content, and the generated notification further comprises at least one user interface element configured to enable the user to request an action to be performed for the item.

At operation 750, a decision indication is received from the user via the generated notification, with the decision indication indicating either to perform the action for the item or not to perform the action. At operation 760, it is determined whether or not to cause the action to be performed based on the decision indication. If it is determined not to cause the action to be performed, then the action is not caused to be performed, and, at operation 780, the user activity information is updated to include the decision indication to not perform the action.

If, at operation 760, it is determined to cause the action to be performed, then, at operation 770, the action is caused to be performed, and the user activity information is updated, at operation 780, to include the decision indication to perform the action. The method 700 then returns to the beginning to wait for more event information for the same item or for another item. The determinations of whether or not to provide a notification of an event to a user, at operation 720, can be made based on user activity information that incorporates decision indications previously received at operation 750.

It is contemplated that the operations of method 700 can incorporate any of the other features disclosed herein.

It is contemplated that any features of any embodiments disclosed herein can be combined with any other features of any other embodiments disclosed herein. Accordingly, these any such hybrid embodiments are within the scope of the present disclosure.

Figure 8:
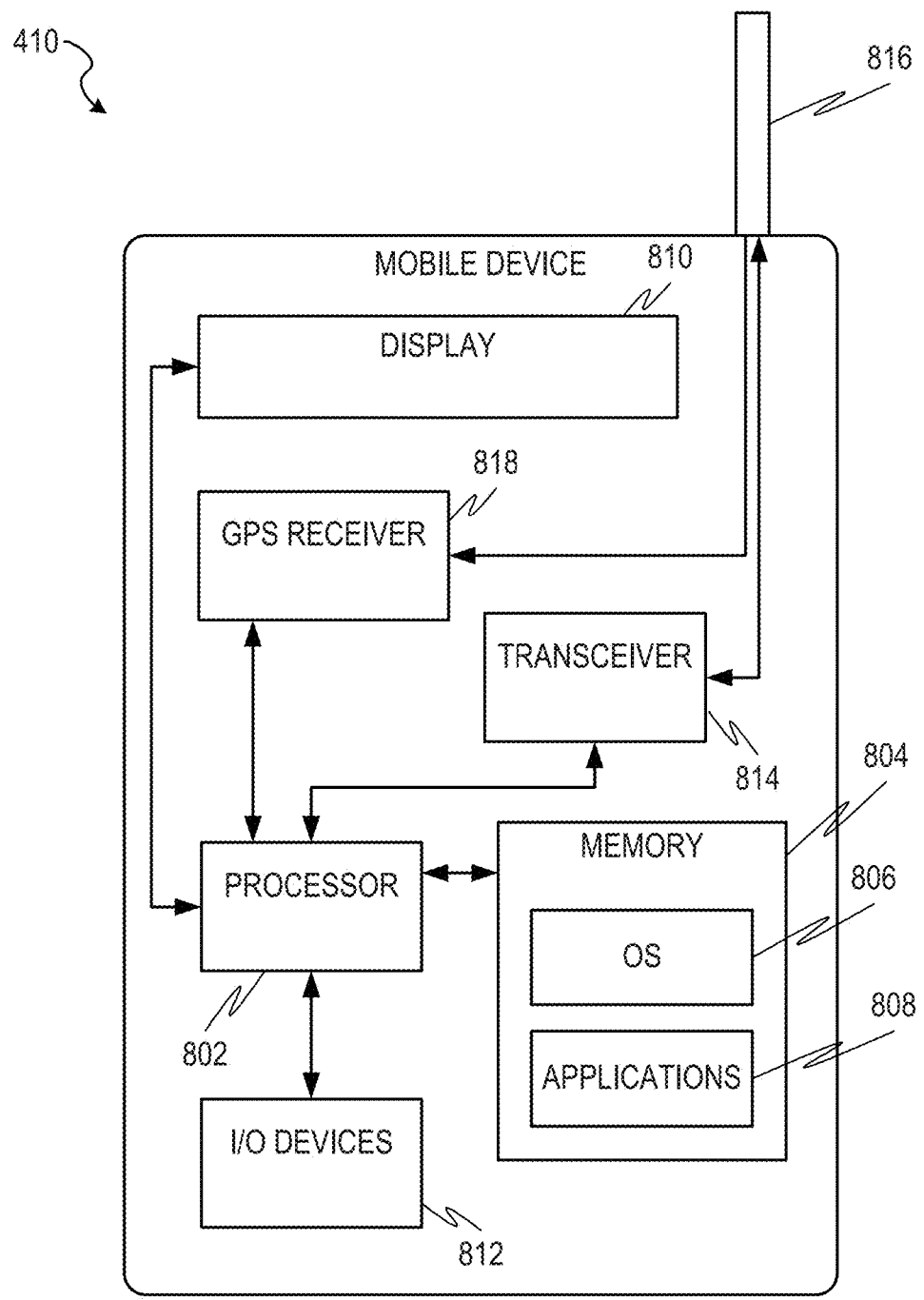
FIG. 8 is a block diagram illustrating a mobile device, in accordance with some example embodiments.

FIG. 8 is a block diagram illustrating a mobile device 410, in accordance with some example embodiments. The mobile device 410 can include a processor 802. The processor 802 can be any of a variety of different types of commercially available processors suitable for mobile devices 410 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location enabled application that can provide LBSs to a user. The processor 802 can be coupled, either directly or via appropriate intermediary hardware, to a display 810 and to one or more input/output (I/O) devices 812, such as a keypad, a touch panel sensor, a microphone, and the like. Similarly, in some example embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 410. Further, in some configurations, a GPS receiver 818 can also make use of the antenna 816 to receive GPS signals.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-8 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the features of the present disclosure in different contexts from the disclosure contained herein.

Figure 9:
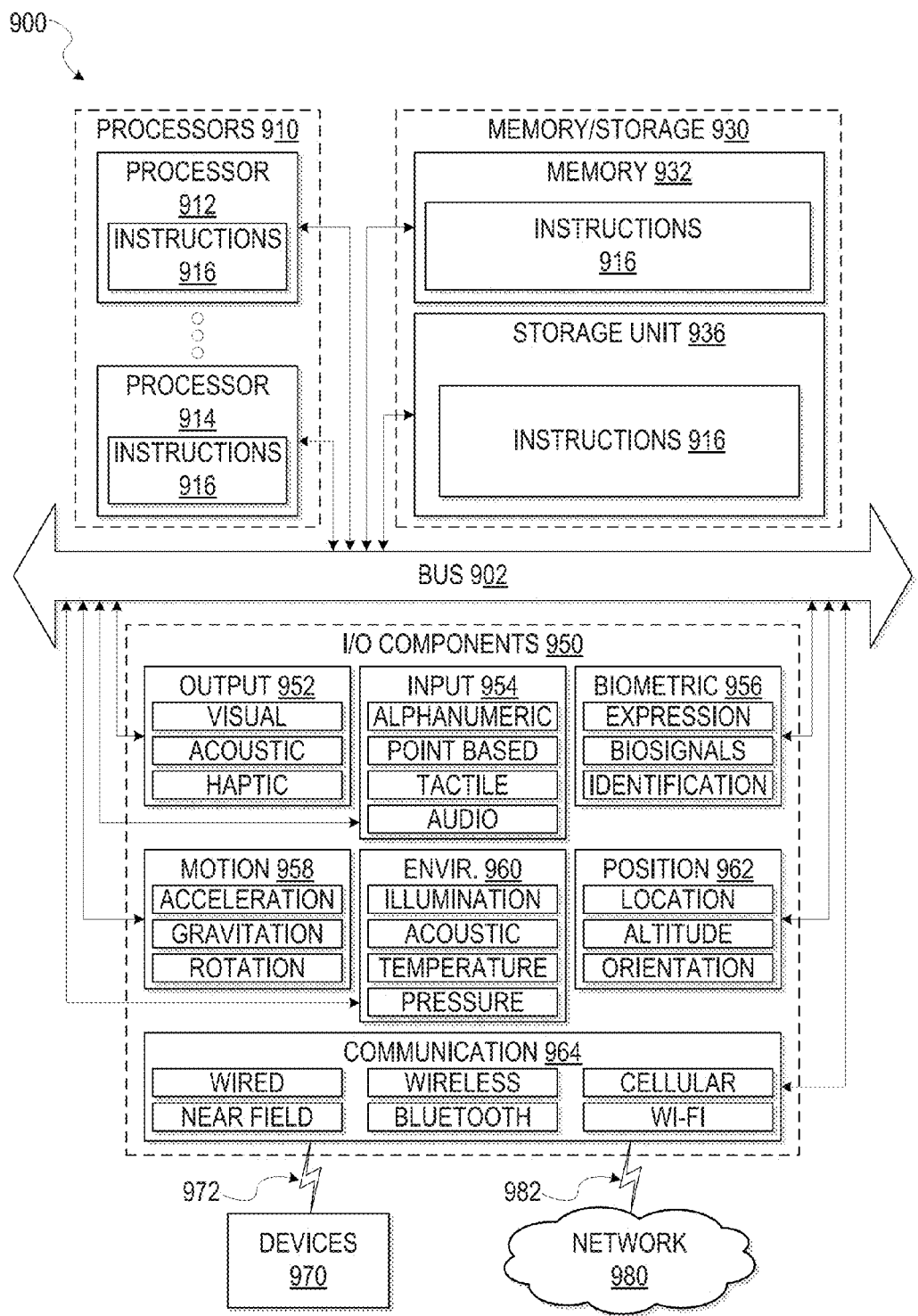
FIG. 9 is a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions may cause the machine to execute the flow diagrams of FIGS. 11-14. Additionally, or alternatively, the instructions may implement the outage detection module 410, the listing identification module 420, and the management action module 430 of FIG. 4, and so forth. The instructions transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which attitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) goo-location, location via Wi-Fi® signal triangulation, location via detecting a NFC beacon signal that may indicate a particular location, and so forth.

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor; and
   a non-transitory computer-readable medium storing executable instructions that, when executed, causes the at least one processor to perform operations comprising:
   obtaining user activity information of a user of a mobile device, wherein obtaining the user activity information includes at least detecting, via a GPS receiver of the mobile device, the current location of the mobile device;
   receiving first event information indicating a first event for a first item;
   determining to provide a first notification to a user based on the first event information and user activity information for the user; and
   generating the first notification based on the determination to provide the first notification, the generated first notification comprising the first event information;
   displaying the generated first notification on a screen of the mobile device via a first application on the mobile device of the user without causing the mobile device to leave a first context of first content being displayed on the mobile device prior to the generated first notification being displayed on the mobile device, the first application being independent of the first context of the first content, the generated first notification overlaying the first content, and the generated first notification further comprising at least one first user interface element configured to enable the user to request a first action to be performed for the first item;
   receiving, via the generated first notification, a first decision indication from the user, the first decision indication indicating either to perform the first action for the first item or not to perform the first action;
   in response to receiving the first decision indication, update the user activity information to include the first decision indication;
   receiving second event information indicating a second event for a second item;
   determining to provide a second notification to the user based on the second event information and the updated user activity information for the user;
   generating the second notification based on the determination to provide the second notification, the generated second notification comprising the second event information; and
   displaying the generated second notification on the screen of the mobile device via the application on the mobile device without causing the mobile device to leave a second context of second content being displayed on the mobile device prior to the generated second notification being displayed on the mobile device, the application being independent of the second context of the second content, the generated second notification overlaying the second content, and the generated second notification further comprising at least one second user interface element configured to enable the user to request a second action to be performed for the second item.

2. The system of claim 1, wherein the first decision indication indicates to perform the first action, and the operations further comprise displaying the first action for the first item to be performed based on the first decision indication.

3. The system of claim 1, wherein the user activity information comprises at least one of a browsing history of the user, a bidding history of the user, a purchase history of the user, and a location of the user.

4. The system of claim 1, wherein the determination to provide the first notification is further based on at least one of a determined time-sensitivity level of the event and a purchase path position of the item.

5. The system of claim 1, wherein the first action comprises placing a bid on the first item, raising a bid on the first item, adding the first item to a shopping cart, purchasing the first item, and responding to a question corresponding to the first item.

6. The system of claim 1, wherein the display of the generated first notification on the screen is restricted to less than half of the screen.

7. The system of claim 1, wherein the first context of the first content comprises a home screen of an operating system of the mobile device or a second application separate and independent of the first application.

8. A computer-implemented method comprising:
obtaining user activity information of a user of a mobile device, wherein obtaining the user activity information includes at least detecting, via a GPS receiver of the mobile device the current location of the mobile device;
receiving first event information indicating a first event for a first item;
determining, by a machine having a memory and at least one processor, to provide a first notification to a user based on the first event information and user activity information for the user;
generating the first notification based on the determination to provide the first notification, the generated first notification comprising the first event information;
displaying the generated first notification on a screen of the mobile device via a first application on the mobile device of the user without causing the mobile device to leave a first context of first content being displayed on the mobile device prior to the generated first notification being displayed on the mobile device, the first application being independent of the first context of the first content, the generated first notification overlaying the first content, and the generated first notification further comprising at least one first user interface element configured to enable the user to request a first action to be performed for the first item;
receiving, via the generated first notification, a first decision indication from the user, the first decision indication indicating either to perform the first action for the first item or not to perform the first action;
in response to receiving the first decision indication, updating the user activity information to include the first decision indication;
receiving second event information indicating a second event for a second item;
determining to provide a second notification to the user based on the second event information and the updated user activity information for the user;
generating the second notification based on the determination to provide the second notification, the generated second notification comprising the second event information; and
displaying the generated second notification on the screen of the mobile device via the application on the mobile device without causing the mobile device to leave a second context of second content being displayed on the mobile device prior to the generated second notification being displayed on the mobile device, the application being independent of the second context of the second content, the generated second notification overlaying the second content, and the generated second notification further comprising at least one second user interface element configured to enable the user to request a second action to be performed for the second item.

9. The method of claim 8, wherein the first decision indication indicates to perform the first action, and the method further comprises causing the first action for the first item to be performed based on the first decision indication.

10. The method of claim 8, wherein the user activity information comprises at least one of a browsing history of the user, a bidding history of the user, a purchase history of the user, and a location of the user.

11. The method of claim 8, wherein the first action comprises placing a bid on the first item, raising a bid on the first item, adding the first item to a shopping cart, purchasing the first item, and responding to a question corresponding to the first item.

12. The method of claim 8, wherein the first context of the first content comprises a home screen of an operating system of the mobile device or a second application separate and independent of the first application.

13. A non-transitory machine-readable storage medium storing as set of instructions that, when executed by at least one processor, causes the at least one processor to perform operations comprising:
obtaining user activity information of a user of a mobile device, wherein obtaining the user activity information includes at least detecting, via a GPS receiver of the mobile device, the current location of the mobile device;
receiving first event information indicating a first event for a first item;
determining to provide a first notification to a user based on the first event information and user activity information for the user;
generating the first notification based on the determination to provide the first notification, the generated first notification comprising the first event information;
displaying the generated first notification on a screen of the mobile device via a first application on the mobile device of the user without causing the computing device to leave a first context of first content being displayed on the mobile device prior to the generated first notification being displayed on the mobile device, the first application being independent of the first context of the first content, the generated first notification overlaying the first content, and the generated first notification further comprising at least one first user interface element configured to enable the user to request a first action to be performed for the first item;

receiving, via the generated first notification, a first decision indication from the user, the first decision indication indicating either to perform the first action for the first item or not to perform the first action;

in response to receiving the first decision indication, updating the user activity information to include the first decision indication;

receiving second event information indicating a second event for a second item;

determining to provide a second notification to the user based on the second event information and the updated user activity information for the user;

generating the second notification based on the determination to provide the second notification, the generated second notification comprising the second event information; and displaying the generated second notification on the screen of the mobile device via the application on the mobile device without causing the mobile device to leave a second context of second content being displayed on the mobile device prior to the generated second notification being displayed on the mobile device, the application being independent of the second context of the second content, the generated second notification overlaying the second content, and the generated second notification further comprising at least one second user interface element configured to enable the user to request a second action to be performed for the second item.

* * * * *